(12) United States Patent
Pierres et al.

(10) Patent No.: US 12,491,752 B2
(45) Date of Patent: Dec. 9, 2025

(54) HEATING, VENTILATION AND/OR AIR-CONDITIONING DEVICE FOR A MOTOR VEHICLE

(71) Applicant: Valeo Systemes Thermiques, Le Mesnil Saint-Denis (FR)

(72) Inventors: Philippe Pierres, Le Mesnil Saint-Denis (FR); Thierry Barbier, Le Mesnil Saint-Denis (FR); Yves Rousseau, Le Mesnil Saint-Denis (FR); Naveenkumar Ummidi, Tamil Nadu (IN)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 407 days.

(21) Appl. No.: 17/638,957

(22) PCT Filed: Jul. 29, 2020

(86) PCT No.: PCT/FR2020/051401
§ 371 (c)(1),
(2) Date: Feb. 28, 2022

(87) PCT Pub. No.: WO2021/038154
PCT Pub. Date: Mar. 4, 2021

(65) Prior Publication Data
US 2022/0297502 A1 Sep. 22, 2022

(30) Foreign Application Priority Data
Aug. 28, 2019 (FR) .................................... 1909475

(51) Int. Cl.
*B60H 1/00* (2006.01)
(52) U.S. Cl.
CPC ..... *B60H 1/00564* (2013.01); *B60H 1/00457* (2013.01); *B60H 1/00692* (2013.01)

(58) Field of Classification Search
CPC ............ B60H 1/00564; B60H 1/00457; B60H 1/00692; B60H 2001/00164
See application file for complete search history.

(56) References Cited

U.S. PATENT DOCUMENTS

| 6,351,961 B1* | 3/2002 | Kurokawa | B60H 1/0005 |
| | | | 62/244 |
| 2003/0019233 A1 | 1/2003 | Nakagawa et al. | |
| 2003/0171091 A1* | 9/2003 | Uemura | B60H 1/00692 |
| | | | 454/156 |

FOREIGN PATENT DOCUMENTS

| CN | 107340210 A | 11/2017 |
| CN | 208664883 U | 3/2019 |

(Continued)

OTHER PUBLICATIONS

English translation of WO-2016008753-A1, dated Oct. 23, 2024 (Year: 2024).*

(Continued)

*Primary Examiner* — Edelmira Bosques
*Assistant Examiner* — Brett Peterson Mallon
(74) *Attorney, Agent, or Firm* — Osha Bergman Watanabe & Burton LLP

(57) ABSTRACT

A heating, ventilating and/or air-conditioning device for a motor vehicle, comprising a housing that defines a flow channel having at least a first duct for the flow of a first stream of air, defining a first air outlet, at least a second duct for the flow of a second stream of air, defining a second air outlet, at least one mixing chamber communicating with the respective air outlets of said ducts, and at least one mixing flap comprising a first sliding door arranged so as to control the apportionment of the first stream of air and second stream of air in said at least one mixing chamber, said at least one mixing flap being arranged so as to be movable between a first end position, in which it closes the first duct, and a (Continued)

second end position, in which it closes the second duct. According to the invention, said first sliding door has at least one recess, so as to fluidically connect the first air duct and the second air duct, when said at least one mixing flap is arranged in an intermediate position between the first and the second end position.

8 Claims, 2 Drawing Sheets

(56) References Cited

FOREIGN PATENT DOCUMENTS

| | | | |
|---|---|---|---|
| FR | 3072331 A1 | 4/2019 | |
| JP | H11-99817 A | 4/1999 | |
| JP | 2013023120 A * | 2/2013 | ......... B60H 1/00685 |
| JP | 2019-177742 A | 10/2019 | |
| KR | 20110126231 A | 11/2011 | |
| WO | WO-2016008753 A1 * | 1/2016 | ......... B60H 1/00507 |
| WO | 2016/158250 A1 | 10/2016 | |

OTHER PUBLICATIONS

English translation of JP-2013023120-A, dated Feb. 6, 2025 (Year: 2025).*
Office Action Issued in corresponding CN Application No. 202080066493.2, dated Jan. 16, 2024. (7 Pages).
International Search Report and Written Opinion in corresponding International Application No. PCT/FR2020/051401, mailed Nov. 2, 2020 (12 pages).

* cited by examiner

[Fig. 1]
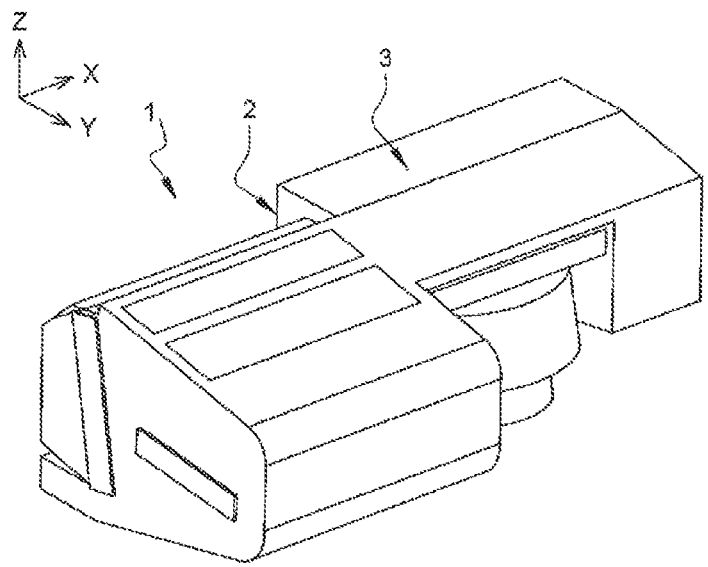
[Fig. 2]
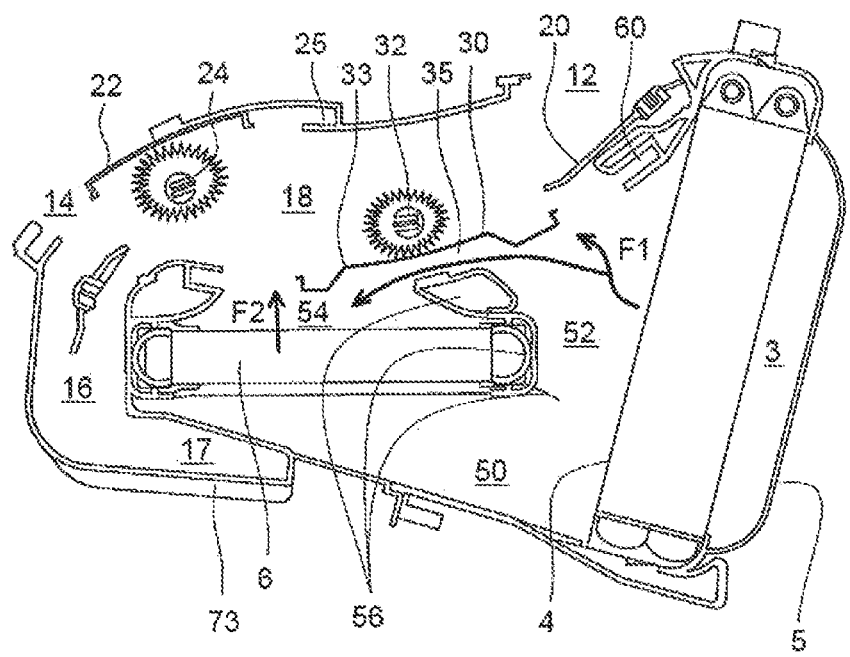

[Fig. 3]
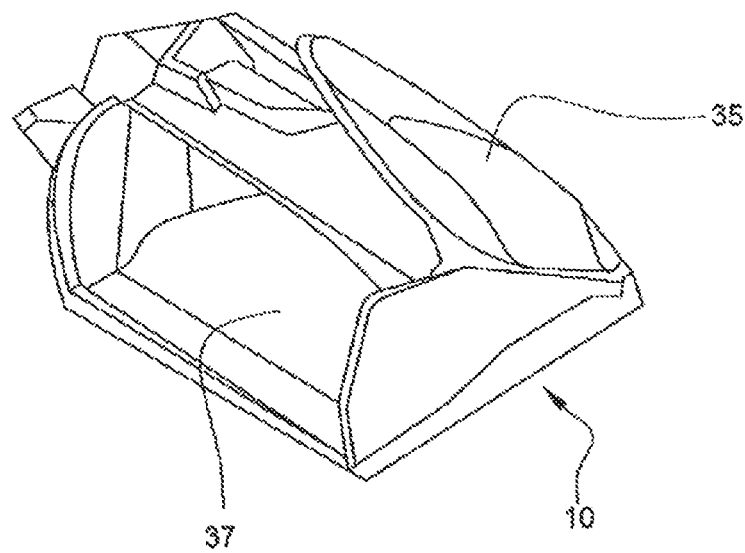

HEATING, VENTILATION AND/OR AIR-CONDITIONING DEVICE FOR A MOTOR VEHICLE

The invention relates to the field of heating, ventilating and/or air-conditioning devices for a motor vehicle and also to a motor vehicle comprising such a device.

It relates more particularly to a device comprising a first duct, such as a cold-air duct, a second duct, such as a hot-air duct, a mixing chamber communicating with respective air outlets of said ducts, and at least one mixer, capable of apportioning a stream of air between these ducts in a proportion chosen so as to regulate the temperature of the air in the mixing chamber.

Devices of this type for mixing, in a set proportion, a stream of cold air coming from the cold-air duct and a stream of hot air coming from the hot-air duct so as to obtain, in the mixing chamber, a stream of air at a regulated temperature, are already known.

This stream of air is then apportioned in the passenger compartment of the vehicle by suitable distribution means, comprising air outlet ducts that lead to various openings or nozzles disposed at chosen locations in the passenger compartment.

According to a known solution, the mixers comprise a mixing flap, for example a flap of the sliding-door type able to control the cold-air duct outlets and/or hot-air duct outlets.

Such a flap can be moved in translation from one to the other of two end positions including a "hot" end position, in which the outlet of the cold-air duct is closed and the outlet of the hot-air duct is open, and a "cold" end position in which the outlet of the hot-air duct is closed and the outlet of the cold-air duct is open.

Such a device, having a mixing flap of the sliding-door type, in particular has the drawback that, when the flap transfers from the "hot" end position to the "cold" end position, cold air enters the mixing chamber from a region of the outlet of the cold-air duct that is close to a free edge of the sliding door. This particular region is located specifically away from the region of the outlet of the hot-air duct, through which the stream of hot air enters the mixing chamber, i.e. close to a facing edge of the sliding door. As a result, the stream of air and the stream of hot air tend to stratify and to not mix well, thus running the risk of not complying with the setpoint temperatures given by the occupants of the vehicle.

The object of the invention is in particular to overcome such a drawback.

For this purpose, the invention proposes a heating, ventilating and/or air-conditioning device for a motor vehicle, comprising a housing that defines a flow channel for a stream of air having
  a. at least a first duct for the flow of a first stream of air, defining a first air outlet,
  b. at least a second duct for the flow of a second stream of air, defining a second air outlet,
  c. at least one mixing chamber communicating with the respective air outlets of said ducts, and
  d. at least one mixing flap comprising a first sliding door arranged so as to control the apportionment of the first and second streams of air in said at least one mixing chamber, said at least one mixing flap being arranged so as to be movable between a first end position, in which it closes the first duct, and a second end position, in which it closes the second duct.

According to the invention, said first sliding door has at least one recess, so as to fluidically connect the first air duct and the second air duct, when said at least one mixing flap is arranged in an intermediate position between the first and the second end position.

In this way, with the aim of promoting the mixing and avoiding stratification, the first sliding door makes it possible to define an additional channel for conveying part of the stream of air flowing within the first duct through said at least one mixing flap and within the second duct. In other words, the recess, or cavity, makes it possible to define an additional channel connecting the first duct and the second duct, this being the case when the mixing flap is in an intermediate position between the first and the second end position.

Particular embodiments according to the invention provide that:
  a. a first heat exchanger, a second heat exchanger are arranged within the device,
      i. the first duct directly connecting the first heat exchanger to the mixing chamber and bypassing the second heat exchanger, thus allowing the stream of cold air to flow from the first heat exchanger directly into the mixing chamber,
      ii. the second duct connecting the second heat exchanger to the mixing chamber, thus allowing the stream of hot air to flow from the second heat exchanger directly into the mixing chamber,
      iii. a third duct X connecting the first heat exchanger to the second heat exchanger, thus allowing the stream of cold air to flow from the first heat exchanger to the second heat exchanger;
  b. the recess has a depth that falls within a range of [3-30] millimeters; in other words, the recess has a height or depth ranging from 3 millimeters up to 30 millimeters inclusive.
  c. the device comprises at least one air outlet opening arranged downstream of the mixing chamber, each air outlet opening being configured to guide the stream of air in particular toward various regions of a vehicle passenger compartment, and at least one air outlet duct running along a wall of the flow channel so as to direct the stream of air in a direction substantially away from the direction of the stream of air as it passes through the first heat exchanger;
  d. the air outlet duct is defined on the one hand by a wall of the housing that defines the flow channel and on the other hand by another, external wall arranged outside the flow channel;
  e. the housing comprises an air inlet and said air outlet duct is arranged on the opposite part of the housing to said air inlet;
  f. the device comprises a second distribution flap comprising a second sliding door is arranged so as to be able to at least partially close another of said air outlet ducts;
  g. the first and second heat exchangers form an angle that falls within a range of 40° to 120°;
  h. the housing is of elongate shape and in which a blower, the first and the second heat exchangers are aligned in a transverse axis of said housing, the first and the second heat exchangers being aligned in a longitudinal axis of said housing.

The invention also relates to a motor vehicle comprising a heating, ventilating and/or air-conditioning device as described above.

One aspect according to the invention provides that the second heat exchanger is arranged so as to be substantially horizontal with respect to the vehicle in the mounted state and that the first heat exchanger is arranged so as to be substantially vertical with respect to the vehicle in the mounted state.

Further features and advantages of the invention will become apparent from reading the following description, with reference to the accompanying figures, in which:

FIG. 1 shows a perspective view of the heating, ventilating and/or air-conditioning device according to the invention;

FIG. 2 shows a profile view of part of the heating, ventilating and/or air-conditioning device according to the invention;

FIG. 3 shows a perspective view of part of the heating, ventilating and/or air-conditioning device.

The following embodiments are examples. Although the description refers to one or more embodiments, this does not necessarily mean that each reference relates to the same embodiment, or that the features apply only to a single embodiment. Individual features of various embodiments may also be combined or interchanged in order to create other embodiments.

The terms "upstream" and "downstream" are always with reference to the flow of a stream of air circulating within the heating, ventilating and/or air-conditioning device.

[FIG. 1] and [FIG. 2] schematically show an XYZ trihedron where a longitudinal axis X of the heating, ventilating and/or air-conditioning device 1 may correspond to the front/rear longitudinal axis of the vehicle, A transverse axis Y of the heating, ventilating and/or air-conditioning device 1 may correspond to the right/left transverse axis of the vehicle, and a vertical axis Z of the heating, ventilating and/or air-conditioning device 1 may correspond to the top/bottom vertical axis of the vehicle, each axis being perpendicular to one another in particular when the heating, ventilating and/or air-conditioning device 1 is installed in the motor vehicle.

To obtain a heating, ventilating and/or air-conditioning device with a small vertical spatial bulk, the invention as shown in [FIG. 1], the invention provides a heating, ventilating and/or air-conditioning device 1 comprising a housing 2 of elongate shape that defines a flow channel for a stream of air intended to be distributed in the passenger compartment in which are housed means for thermally treating the stream of air. In other words, as shown in [FIG. 2], the housing 2 defines, by means of walls 5, a flow channel 3, or a flow duct, for conveying a stream of air from an air inlet to an air outlet.

The thermal treatment means comprise a first heat exchanger 4, for example an evaporator, intended to cool and dehumidify the entire stream of air circulating in the flow channel 3.

The thermal treatment means also comprise a second heat exchanger 6, for example a radiator, intended to heat some of the stream of air circulating in the heating, ventilating and/or air-conditioning device 1, and is arranged downstream, relative to the flow of the stream of air, from the first heat exchanger 4. The second heat exchanger 6 may optionally be coupled to an additional electric radiator intended to heat the stream of air more quickly, in particular when starting the vehicle.

The stream of air is introduced into the housing 2 via at least one air inlet 10 and then is directed via a blower which comprises a motor and a paddle wheel to this end. The blower routes the stream of air from the air inlet 10 to at least one outlet, after said stream of air has been thermally treated by the heat exchangers 4, 6. The air inlet 10 corresponds to an air inlet housing comprising two openings, an external air inlet 35 and a recycling air inlet 37 as [FIG. 3] shows. A flap may be arranged between the two openings so as to at least partially close each one. The air inlet 10 is arranged on the upper part with respect to the vertical axis Z of the heating, ventilating and/or air-conditioning device 1.

The stream of aft entering the housing is conveyed from the air inlet 10 through a volute corresponding to a part of the spiral housing. The volute has an air inlet corresponding to an orifice present within the spiral housing, also called casing. The volute presents a radial evolution starting from a point N called the nose of the volute, over an angle range which can go from 0° to 360°. The volute then has a volute outlet having the shape of a rectilinear duct so that the stream of air leaving the volute follows this same shape. The stream of air then ends up in a part called the divergent which corresponds to a part of the rectilinear flow channel 3 having a height increase along the axis Z. The stream of air flows through the divergent up to the first heat exchanger 4.

Once the stream of air has been cooled by the first heat exchanger 4, the device 1 comprises a third duct 50 (the two first ducts are described below) fluidically connecting the first heat exchanger 4 to the second heat exchanger 6. In this way, the stream of air permitting the stream of cold air can flow from the first heat exchanger 4 to the second heat exchanger 6.

According to the embodiment shown in FIG. 2, to ensure that the stream of cold air from the first heat exchanger 4 is not thermally contaminated by the second heat exchanger 6, the device 1 comprises a first duct 52 bypassing the second heat exchanger 6. In this way, the stream of cold air, having passed through the first heat exchanger 4, circulates either through the second heat exchanger 6 via the third duct 50 so as to be heated, or bypasses the second heat exchanger 6 via the first duct 52 in order to maintain its low temperature. The stream of air heated by the second heat exchanger 6 flows downstream of the latter within a second duct 54.

The ducts 50, 52, 54 correspond to portions of the flow channel 3 and are separated from one another by internal partitions 56, or deflectors, or else by the heat exchanger 6 arranged between the third duct 50 and the second duct 54.

The stream of hot air and the stream of cold air circulating in the second duct 54 and in the first duct 52, respectively, are then directed as far as a mixing area 18 to be mixed there and distributed to the air outlet openings 12, 14, 16 at setpoint temperatures. To achieve this mixing in variable proportions, the device 1 comprises a mixing flap 30 for regulating the proportion of the stream of hot air from the second duct 54 and the proportion of the stream of cold air from the first duct 52.

The mixing flap 30 corresponds to a flap of the sliding-door type, that is to say it comprises a first sliding door 30 on which is arranged at least one rack. In order to set the mixing flap 30 in motion, at least one gear 32 complementary to the rack is rotated about an axis by an actuator (not shown). The rotation of the gear 32 moves the first sliding door 30 between two end positions, a first end position in which the mixing flap 30 completely closes the first duct 52 in order that the stream of cold air cannot access the mixing chamber 18 and a second end position in which the mixing flap 30 closes the second air duct 54 such that the stream of air that has passed through the second heat exchanger 6 cannot access the mixing chamber 18. The first sliding door 30 is configured to adopt any intermediate configuration.

In other words, the device 1 comprises at least a first duct 52 for the flow of a first stream of air F1 corresponding to a stream of cold air, defining a first air outlet. The device comprises at least a second duct 54 for the flow of a second stream of air F2 corresponding to a stream of hot air, defining a second air outlet. The device 1 comprises at least one mixing chamber 18 communicating with the respective air outlets of said ducts 52, 54. The device 1 also comprises at least one mixing flap 30 comprising a first sliding door 30 arranged so as to control the apportionment of the first stream of air F1 and second stream of air F2 in said at least one mixing chamber 18, said at least one mixing flap 30 being arranged so as to be movable between a first end position, in which it closes the first air outlet of the first duct 52, and a second end position, in which it closes the second air outlet of the second duct 54, and is movable between any intermediate position. According to the invention, said first sliding door 30 has at least one recess 33, so as to fluidically connect the first air duct 52 and the second air duct 54, when said at least one mixing flap 30 is arranged in an intermediate position between the first and the second end position.

The sliding door according to the invention comprises a recess 33, in other words a cavity or an indentation. It can also be said that the first sliding door 30 has an omega-shaped profile section (or the sliding door has an omega-shaped profile), or that the sliding door has 4 elbows, or 4 bends. This recess 33 has a height, relative to the dimensions of the flap, in a range of between [3-30] millimeters; it can also be considered to have a depth of between 3 and 30 millimeters. Such a depth ensures that a sufficient flow of the stream of cold air can go from the first duct 52 to the second duct 54 and ensure sufficient pre-mixing so as to limit the stratification phenomena.

The mixing flap 30 can also be described as comprising a sliding door made up of three substantially flat parts with a central part located between the two other end parts, each of which being located at a longitudinal end of the mixing flap 30. The central part is connected to each end part by a section that is inclined or perpendicular in relation to each substantially flat part such that the central part is offset vertically with respect to the two end parts. Expressed differently, the end parts are arranged in one and the same plane while the central part is arranged in a separate plane which is parallel to the plane of the end parts. The height, or the depth, of the axial offset between the end parts and the central part corresponds to the recess 33.

The first sliding door 30 and more specifically the recess 33 makes it possible to define an additional channel 35 for conveying part of the stream of air F1 flowing within the first duct 52 through said at least one mixing flap 30 and within the second duct 54. In other words, the recess 33, or cavity, makes it possible to define an additional channel 35 connecting the first duct 52 and the second duct 54, this being the case when the mixing flap 30 is in an intermediate position between the first and the second end position.

When the mixing flap 30 is in one of the two end positions, the two ducts 52, 54 are no longer in fluidic communication and either the stream of cold air F1 or the stream of hot air F2 enters the mixing chamber 18. The first sliding door 30 may comprise seals to ensure better tightness.

The additional channel 35 is defined on the one hand by the sliding door 33 and on the other hand by an internal partition 56 of the housing. Thus, part of the first stream of air F1 corresponding to the stream of cold air circulating in the first duct 52 can be conveyed in the second duct 54 in which flows the second stream of air F2 corresponding to the stream of hot air. This makes it possible for pre-mixing to occur before the mixing chamber 18 and thus limits the stratification phenomena. As FIG. 2 shows, it is ensured in this way that the stream of air leaving through the air outlet openings 14 and 16 is not too hot, since it has been previously mixed with part of the stream of cold air F1.

As FIG. 2 shows, the device comprises a receiving portion 60 in which the mixing flap is partially retracted when the latter is in an end position.

As FIG. 2 shows, the mixing flap 30 is slightly curved and adopts a curved trajectory. It goes without saying that the mixing flap may be flat and adopt a flat trajectory.

The outlet comprises multiple air outlet openings shown in [FIG. 2] that distribute the streams of air to nozzles opening into different regions of the passenger compartment. The air outlet opening 12 is configured to lead the stream of air toward the defrost nozzle, thus making it possible to demist the windshield. The air outlet opening 14 is able to bring the stream of air to the lateral/central ventilation nozzles, thereby making it possible to cool/heat the passengers of the vehicle. Lastly, the air outlet opening 16 directs the stream of air to the foot nozzle, making it possible to cool/heat the feet of the front passengers of the vehicle, Each air outlet opening may be connected to an air duct for conveying the stream of air to the corresponding nozzle.

The air outlet opening 16 referred to as foot air outlet opening is connected to an air outlet duct 17 running along the flow channel 3, and more specifically the third duct 50, in the lower part, with respect to the vertical axis Z of the heating, ventilating and/or air-conditioning device 1. It can also be said that the air outlet duct 17 referred to as "foot" air outlet duct is arranged on the opposite part of the housing 2 to the air inlet 10, or that the "foot" air outlet duct 17 runs along the lower or external surface of the housing 2 of the heating, ventilating and/or air-conditioning device 1, more specifically the "foot" air outlet duct 17 runs along the lower surface of the wall 5 of the housing 2 that defines the flow channel 3. The wall 5 comprises an internal surface that defines an internal volume corresponding to the flow channel 3 and an external surface arranged outside the flow channel 3, the air outlet duct 17 runs along the external surface of said wall 5. As [FIG. 2] shows, the "foot" air outlet duct 17 extends from the mixing chamber 18 to a nozzle that opens into the feet area of the passenger compartment. In other words, the foot air outlet duct 17 comprises an inlet corresponding to the opening 16 and then extends along the walls 5 of the housing 2 to a foot nozzle. It can also be said that the air outlet duct 17 is juxtaposed in relation to, or attached to, the wall 5 of the housing 2 so as to convey the stream of air in a direction substantially away from the direction of the stream of air passing through the first heat exchanger 4. It can likewise be said that the "foot" air outlet duct 17 directs the stream of air from the mixing chamber 18 to the bulkhead, or the firewall, of the vehicle. It will thus be understood that the air outlet duct 17 is defined on the one hand by a wall 5 of the housing 2 that defines the flow channel 3 and on the other hand by another external wall 73 arranged outside the flow channel 3. To this end, the "toot" air outlet duct 17 comprises at least one elbow. Obviously, the invention is not limited to this precise embodiment.

A distribution flap is arranged at each air outlet opening 12, 14, 16. Each distribution flap is configured to transfer from a configuration in which it completely closes each air outlet opening to a configuration in which it allows the stream of air to circulate entirely within the corresponding air outlet duct. Obviously, each distribution flap is able to adopt any intermediate position.

A first distribution flap 22 of the sliding-door type, corresponding to a sliding door that moves slidingly within rails and on which is arranged at least one rack. In order to set the first distribution flap 22 in motion, at least one gear 24 complementary to the rack is rotated about an axis by an actuator (not shown). The rotation of the gear 24 moves the second sliding door 22 between two end positions, a first end position in which the first distribution flap 22 closes the air outlet opening 14 and a second end position in which the first distribution flap 22 allows the stream of air from the mixing chamber 18 to flow through the air outlet opening 14. As FIG. 2 shows, the first distribution flap 22 is not flat, in other words the second sliding door 22 is curved and adopts a curved trajectory. It can also be said that the second sliding door 22 can be inscribed in a plurality of planes.

In the second end position, the first distribution flap 22 is arranged in a recessed receiving portion 25 in which the second sliding door 22 is partially retracted. The recessed receiving portion 25 has dimensions (length, width) that are greater than or equal to those of the first air outlet opening 14 in order not to hinder the flow of the stream of air. The device 1 may comprise a second recessed receiving portion 25 in order to partially retract the second sliding door 22 into the other end position. This makes it possible to improve the tightness with respect to a sliding door which butts only against a wall, since the recessed receiving portion 25 creates a labyrinth for the stream of air.

In summary, the first sliding door 30 is arranged upstream of the mixing chamber 18 and the second sliding door 22 is arranged downstream of the mixing chamber 18, this being with respect to the flow of the stream of air.

A second, flag-type distribution flap 20, corresponding to a door with a rotary shaft arranged at one of the ends of the door, is arranged at the air outlet opening 12.

A third, butterfly-type distribution flap 26, corresponding to a flap with a rotary shaft and one or two blades arranged on either side of the rotary shaft, is arranged at the air outlet opening 16 and makes it possible to close or to not close the air outlet duct 17 referred to as "foot" air outlet duct.

The first distribution flap 22, the second distribution flap 20 and the third distribution flap 26 are of different types, or different natures, specifically a sliding door, a flag flap and a butterfly flap. In other words, the first distribution flap 22 is of a different type than the second distribution flap 20 and than the third distribution flap 26, the second and third distribution flaps also being of different types.

The first distribution flap 22, the second distribution flap 20 and the third distribution flap 26 are all arranged downstream of the mixing chamber 18 with respect to the flow of the stream of air.

The first heat exchanger 4 comprises two collecting chambers and a heat exchange core bundle comprising a set of tubes or plates, and the heat exchange core bundle is considered here to define a plane. The second heat exchanger 6 comprises two collecting chambers and a heat exchange core bundle comprising a set of tubes or plates, and the heat exchange core bundle is considered here to define a plane, the two heat exchangers 4, 6 can be inscribed in substantially orthogonal planes, this making a considerable gain in height possible.

In order to lessen the spatial restrictions even more, the angle between the plane of the first heat exchanger 4 and the plane of the second heat exchanger 6 falls within a range of from [40° to 120°].

According to the invention, the device 1 comprises a discharge duct for guiding the condensates toward the outside of the housing 2.

The invention claimed is:

1. A heating, ventilating and/or air-conditioning (HVAC) device for a motor vehicle, comprising:
a housing comprising:
a wall with an internal surface that defines a flow channel,
an air inlet comprising an external air inlet and a recycling air inlet;
at least one first duct which conveys a first stream of air from a first heat exchanger;
at least one second duct which conveys a second stream of air from a second heat exchanger;
at least one air mixing chamber communicating with the at least one first duct and the at least one second duct; and
at least one mixing flap comprising a first sliding door configured to control an apportionment of the first stream of air and the second stream of air in the at least one air mixing chamber, wherein the at least one mixing flap is configured to move between:
a first end position at which the at least one mixing flap closes the at least one first duct, and
a second end position at which the at least one mixing flap closes the at least one second duct,
wherein the first sliding door has at least one recess, which defines an additional channel, opposite to the at least one air mixing chamber, and
wherein the additional channel is configured to:
convey part of the first stream of air within the at least one first duct through to the at least one second duct to pre-mix with the second stream of air prior to entering the at least one air mixing chamber
when the at least one mixing flap is at an intermediate position which is between the first end position and the second end position,
wherein the additional channel, formed between the first sliding door and the second heat exchanger, is downstream from the first heat exchanger and the second heat exchanger
wherein the first sliding door has, on each of two end parts, a profile section to form a depth of the at least one recess that ensures a sufficient flow of a diverted part of the first stream of air for sufficient pre-mixing so as to limit a stratification phenomenon.

2. The HVAC device as claimed in claim 1, further comprising:
wherein the at least one first duct is configured to:
directly and fluidically connect the first heat exchanger to the at least one air mixing chamber and
allow the first stream of air to bypass the second heat exchanger;
wherein the at least one second duct is configured to:
connect the second heat exchanger to the at least one air mixing chamber and
allow the second stream of air to flow from the second heat exchanger directly into the at least one air mixing chamber; and
a third duct fluidically connecting the first heat exchanger to the second heat exchanger.

3. The HVAC device as claimed in claim 2, further comprising:
at least one air outlet opening arranged downstream of the at least one air mixing chamber, each of the at least one air outlet opening being configured to guide a stream of air in particular toward various regions of a vehicle passenger compartment, and at least one air outlet duct running along the wall with the internal surface that defines the flow channel to direct the stream of air in a direction substantially away from a direction of the stream of air as it passes through the first heat exchanger.

4. The HVAC device as claimed in claim 3, wherein the at least one air outlet duct is defined on the one hand by the wall with the internal surface that defines the flow channel and on another hand by an external wall arranged outside the flow channel.

5. The HVAC device as claimed in claim 3,
wherein the at least one air outlet duct is arranged on a part of the housing which is opposite to the air inlet.

6. The HVAC device as claimed in claim 3, further comprising a first distribution flap comprising a second sliding door, wherein the first distribution flap is configured to at least partially close the at least one air outlet duct.

7. The HVAC device as claimed in claim 1, wherein the at least one recess has a depth that falls within a range of 3-30 millimeters.

8. A motor vehicle, comprising the HVAC device as claimed in claim 1.

\* \* \* \* \*